United States Patent

Blommel et al.

[11] Patent Number: 5,250,785
[45] Date of Patent: Oct. 5, 1993

[54] METHOD FOR LASER SPLITTING WIPER BLADES

[75] Inventors: Scot A. Blommel, Yellow Springs; Harvey J. Lambert, West Milton, both of Ohio

[73] Assignee: General Motors Corporation, Detroit, Mich.

[21] Appl. No.: 944,611

[22] Filed: Sep. 14, 1992

[51] Int. Cl.⁵ ............................................ B23K 26/00
[52] U.S. Cl. ............................ 219/121.72; 219/121.67
[58] Field of Search ...................... 219/121.67, 121.72

[56] References Cited

U.S. PATENT DOCUMENTS 4,613,742  9/1986  Nelson et al. ............... 219/121.67
4,650,955  3/1987  Zaborowski ................. 219/121.67
4,785,699  11/1988  Oblinger et al. ................ 83/425

Primary Examiner—C. L. Albritton
Attorney, Agent, or Firm—Patrick M. Griffin

[57] ABSTRACT

The joining web of a pair of molded wiper blades is successfully laser slit to produce a pair of sharp, square cornered edges. The wiper blade pair is first securely supported in a fixture beneath the laser lens housing. The laser beam is oriented with the focal point slightly above the surface of the web, rather than at or below it. The laser is set with a low power setting and short pulse length, all designed to minimize the otherwise harmful heat effects. When the beam is run straight down the web, too acceptably sharp edges are produced.

1 Claim, 2 Drawing Sheets

METHOD FOR LASER SPLITTING WIPER BLADES

This invention relates to methods of producing windshield wiper blades in general, and specifically to a method for laser slitting wiper blades.

BACKGROUND OF THE INVENTION

Wiper blades are generally molded in integral, parallel pairs, joined at a thin web. The web is later slit lengthwise, not simply to part the blades, but also to simultaneously produce a wiping edge or lip on each blade that is much cleaner and sharper than that which could be produced by molding the edge directly. The molded blade pairs are typically held in a fixture and slit apart by a sharp knife. This method works well so long as the blades are clamped correctly and the knife remains sharp. Unfortunately, as the knife inevitably dulls, edge quality deteriorates, so the process is inherently inconsistent.

Lasers have been used for some time to cut many different materials, including metal, wood, and various plastics, as well as rubber. Generally, when such materials are cut, the speed of the cut is of more significance than the condition of the edge. With a wiper blade, of course, the condition of the edge, which is the wiping lip of the blade, is all important. It must be smooth, straight and, sharp cornered in order to achieve good wipe quality in both wiping directions. Laser slitting of blades has been attempted following conventional methodology, which teaches that the focal point of the beam should be at or slightly below the surface of the material being cut. This has been found to produce a wiping edge with at least one rounded, non-sharp corner, which is unacceptable.

SUMMARY OF THE INVENTION

The invention provides a laser cutting method especially tailored to wiper blade slitting that does produce an edge with square, sharp corners.

In the embodiment disclosed, a molded pair of wiper blades is first supported on a fixture that provides firm, close support. The fixture is set down into a cutting table that applies a vacuum to pull the blade pair firmly into the fixture. The laser used to slit the blades is deliberately run in such a way as to minimize the harmful heat effects that would otherwise damage the cut edge. A continuous wave $CO_2$ laser is run in pulse mode at a specific power, frequency and linear speed, described below. An assist gas may be used to help cool the cut edge, as well. Most significantly, the focal point of the beam is deliberately placed slightly above the surface being cut, not one or below it. While it is not completely certain what effect this has, the net result of the method as a whole is an acceptable, square cornered, sharp edge.

DESCRIPTION OF THE PREFERRED EMBODIMENT

The invention is described more fully in the written description below, and in the drawings, in which.

Figure 1:
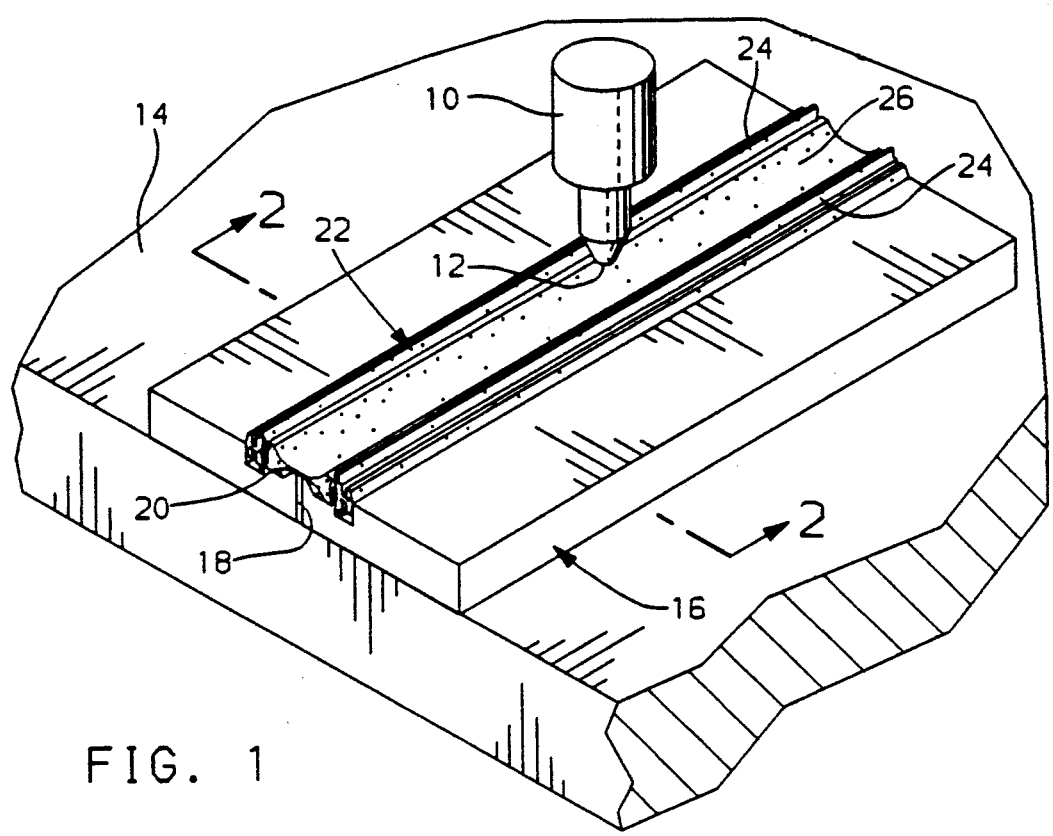
FIG. 1 is a perspective view of the lens housing and jet orifice of a-laser-showing, a fixture supported blade pair.
Figure 2:
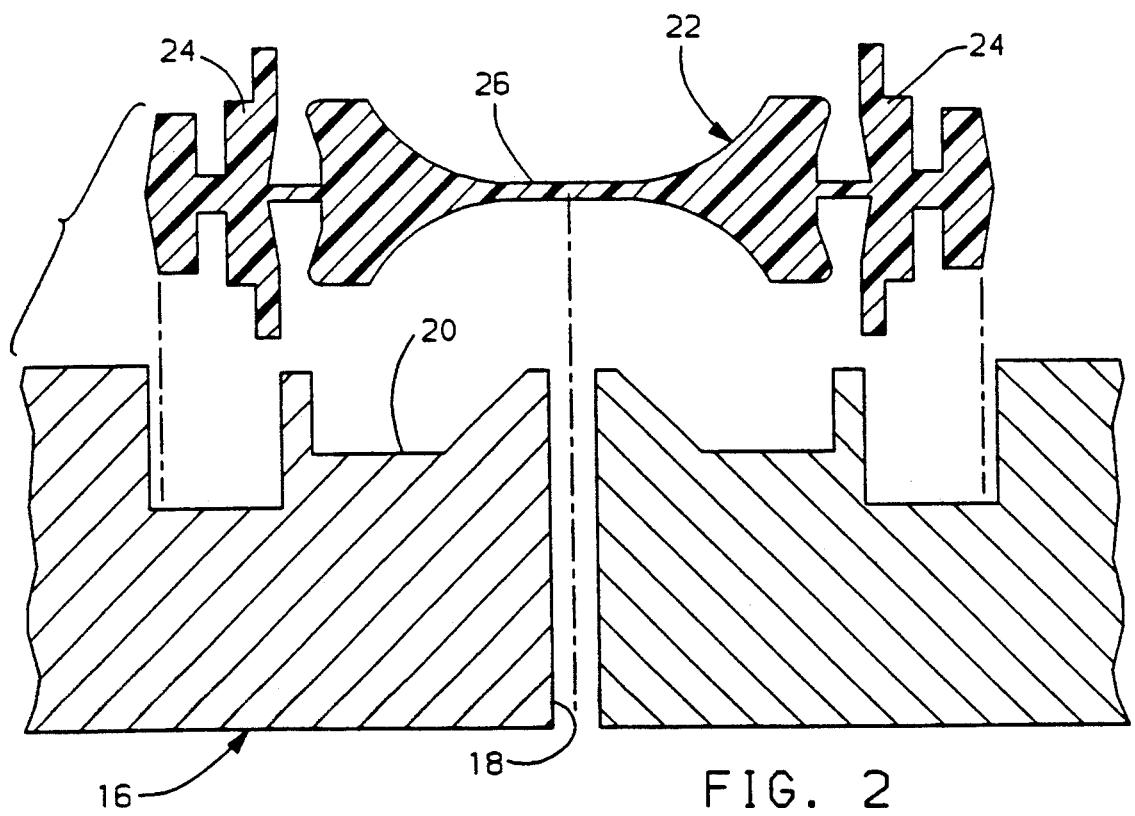
FIG. 2 is a cross section taken along the line 2—2 of FIG. 1 showing the blade pair above the fixture.

Referring first to FIGS. 1 and 2, the basic apparatus for practicing the method of the invention includes a conventional, commercially available $CO_2$ laser, of which only the lens housing (10) and jet orifice (12) are shown. The diameter of the jet orifice (12) of the laser used is 0.060 inches. Jet orifice (12) is the hole that the beam exits, and, conveniently, is also the hole through which a cooling assist gas is sprayed. The lens inside housing (10), not specifically illustrated, is a conventional one with a focal length of 3.750 inches, which is fairly long. A cutting table (14) has a non-illustrated cavity into which is set a specially designed support fixture, indicated generally at (16). Fixture (16) is a steel block machined with a central slot (18) and groove pattern (20) that closely matches and supports the contours of a premolded blade pair, indicated generally at (22). Each side of blade pair (22) includes a spine (24), which is shaped to slide fit into a non-illustrated wiper arm, and a thin central web (26), which is about 0.030 inches thick. It is web (26) that must be slit.

Figure 3:
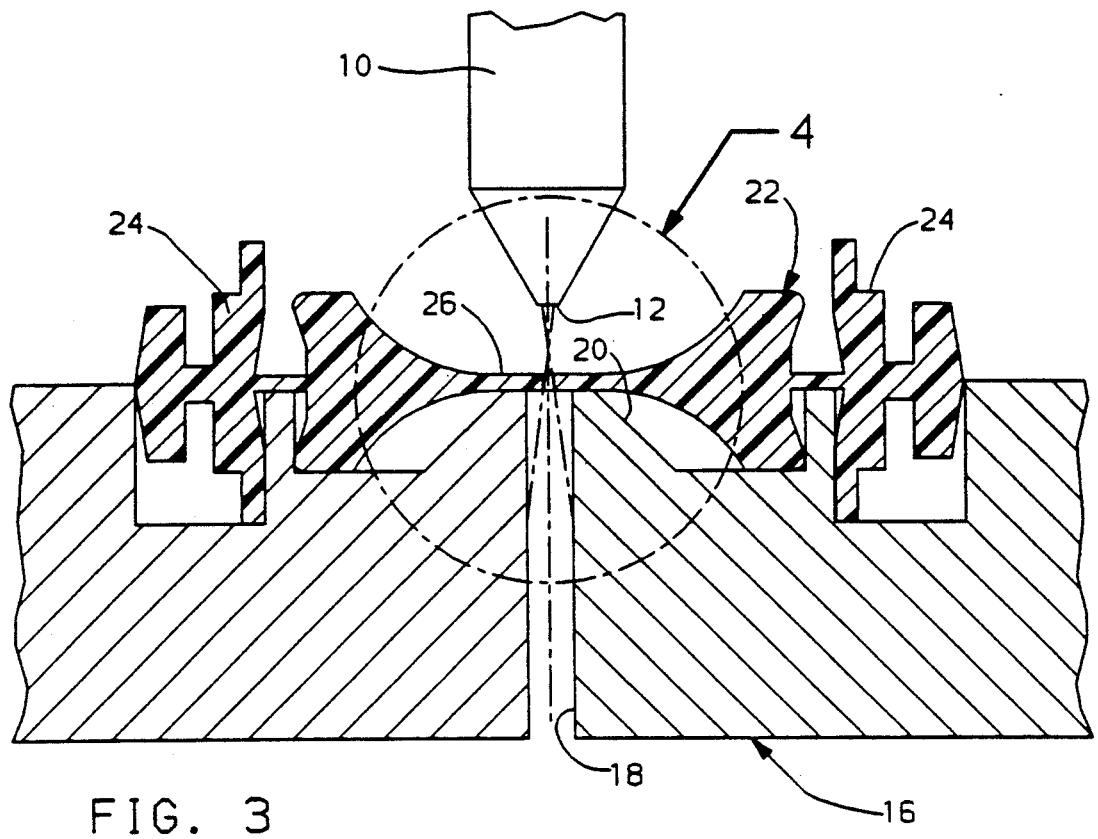
FIG. 3 is a view similar to FIG. 2, but showing the laser beam in operation.

Referring next to FIGS. 2 and 3, the initial step in the slitting process is to set blade pair (22) down into fixture (16). The spines (24) fit closely into respective groove patterns (20), and web (26) is firmly supported centrally over fixture slot (18). A vacuum applied through table (14) and under fixture (16) acts to pull blade pair (22) down and hold it in place. This negative pressure is not applied so strongly as to deform web (26), however. Next, the laser is powered up and run straight down the center of web (26) under a specific set of parameters which, as noted above, have been found to minimize the power and Ueat effects, and to optimize the slit edge quality. usually, the object of using a laser to cut anything is to take advantage of the very high heat, power and cutting speed available. Here, the objective is very different. Speed and power are secondary to edge quality, since the slitting is done not to part the blades per se, but to produce a wiping lip.

Referring to FIG. 3, more detail on the operating parameters is given. Specifically, the power setting is of the $CO_2$ laser used is 350 watts, though this could range between 340–360 watts. The laser is run in pulsed mode, with a pulse length of approximately 0.0001 second. This is a very short pulse length, and is dependent on laser power in the sense that a lower power setting would require a longer pulse length, and vice versa, again, all with the objective of lowering the power and heat effects to an acceptable level. The laser speed used is 1.5 inches per second, which, again, would be slower with lower laser power, and vice versa. The lens housing (10) is situated such that the web (26) is approximately 0.100 inches below the jet orifice (12), indicated at s in FIG. 4, and referred to as the stand off. An assist gas, which is ordinary air, is also supplied through orifice (12) supplied at a pressure of 8 pounds per square inch. Most critically, the focal point is deliberately situated slightly above web (26), not at or below it, by approximately 0.030 inches, indicated at d in FIG. 4. The focal point is not a point per se so much as it is an area or spot where the beam is most constricted, similar to the narrowest diameter of an hourglass. That is where the beam power is most concentrated.

Figure 4:
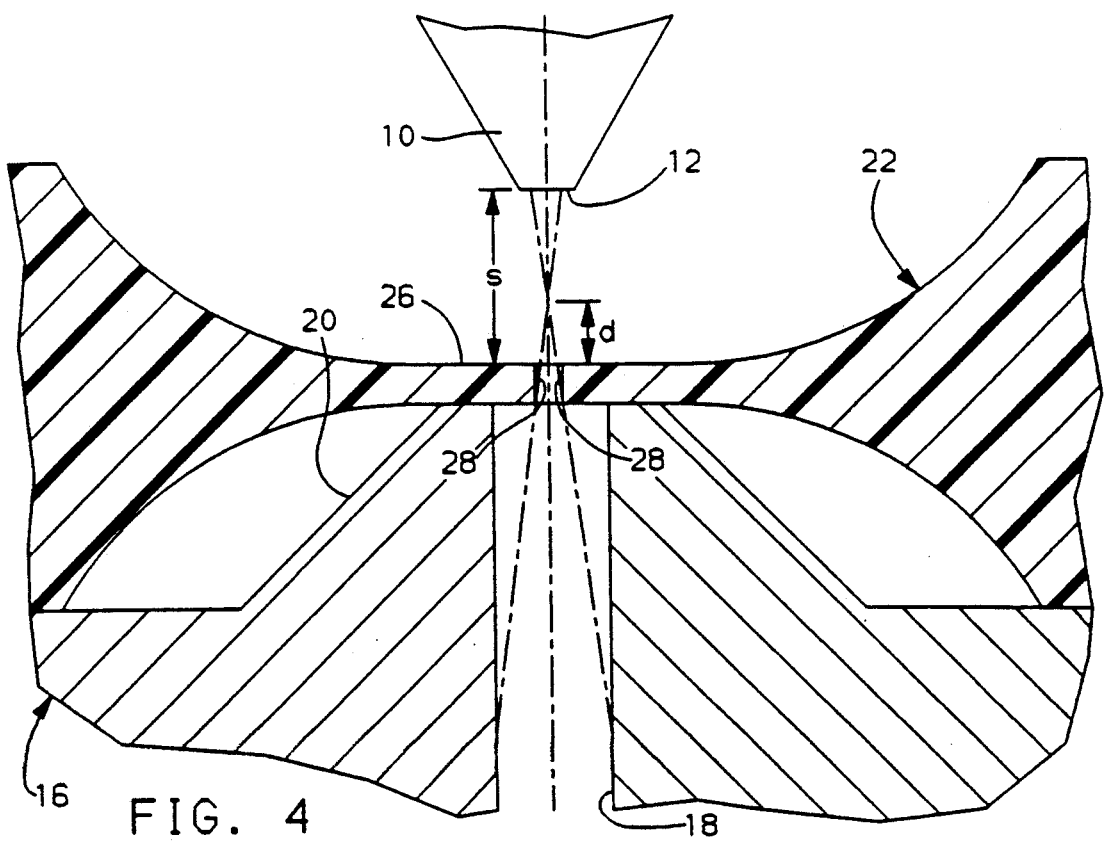
FIG. 4 is an enlargement of the circled portion of FIG. 3.

Referring next to FIG. 4, the result of operating as described above is illustrated. The beam cuts cleanly through web (26) and exits clearly through groove (18), creating an identical pair of sharp cornered wiping edges or lips (28). This as opposed to the rounded, unacceptable edges that were obtained following conventional laser cutting techniques. It is not certain exactly what effect the location of the beam focal point above web (26) has, but it is thought that it helps to minimize the harmful results of beam heat. The provision of the assist gas through orifice (12) also helps to cool the part and clear away fumes and other detritus. Other combinations of power setting, pulse length, and speed could be devised for other lasers that also served to minimize heat effects, so long as the general location of the beam focal point was kept the same. Therefore, it will be understood that it is not intended to limit the invention to just the embodiment disclosed.

The embodiments of the invention in which an exclusive property or privilege is claimed are defined as follows:

1. A method for laser slitting the web of a molded wiper blade pair with a laser having a lens housing and a beam with a predetermined focal point, comprising the steps of, placing said blade pair in a fixture to securely support said web, placing said web beneath said lens housing with said focal point located slightly above said web, and, setting said laser to a predetermined power and pulse length designed to minimize the power of said laser, and running said laser beam straight along said web while maintaining said beam focal point location, thereby slitting said web and producing a pair of sharp, square cornered edges.

* * * * *